United States Patent
Hu et al.

(10) Patent No.: US 12,541,441 B2
(45) Date of Patent: Feb. 3, 2026

(54) REDUNDANCY LATCH DECODER CIRCUIT AND MEMORY

(71) Applicant: XC MEMORY CO., LTD, Zhuhai (CN)

(72) Inventors: Hong Hu, Beijing (CN); Yizhe Yang, Beijing (CN)

(73) Assignee: XC MEMORY CO., LTD., Zhuhai (CN)

( * ) Notice: Subject to any disclaimer, the term of this patent is extended or adjusted under 35 U.S.C. 154(b) by 23 days.

(21) Appl. No.: 18/603,991

(22) Filed: Mar. 13, 2024

(65) Prior Publication Data

US 2024/0362127 A1    Oct. 31, 2024

(30) Foreign Application Priority Data

Apr. 27, 2023    (CN) .......................... 202310475399.8

(51) Int. Cl.
*G06F 11/00*    (2006.01)
*G06F 11/16*    (2006.01)

(52) U.S. Cl.
CPC .................................. *G06F 11/1666* (2013.01)

(58) Field of Classification Search
CPC ............. G06F 11/1666; G06F 11/1616; G06F 11/2094; G06F 11/201
See application file for complete search history.

(56) References Cited

U.S. PATENT DOCUMENTS

| 6,571,348 B1 | 5/2003 | Tsai et al. |
| 9,230,691 B1 | 1/2016 | Boynapalli et al. |
| 11,069,426 B1 * | 7/2021 | Wieduwilt .......... G11C 11/4087 |

(Continued)

FOREIGN PATENT DOCUMENTS

| CN | 1423284 A | 6/2003 |
| CN | 101405817 A | 4/2009 |

(Continued)

OTHER PUBLICATIONS

Chinese First Office Action, Chinese Application No. 202310475399.8, mailed Aug. 26, 2025 (15 pages).

(Continued)

*Primary Examiner* — Joseph D Manoskey

(57) ABSTRACT

A redundancy latch decoder circuit is provided and includes: a redundancy latch circuit, including multiple redundancy latch sections corresponding to multiple memory sections of the memory, wherein each redundancy latch section includes at least one normal redundancy latch unit, at least a portion of the redundancy latch sections is configured into at least one redundancy latch sharing group, each redundancy latch sharing group includes at least one shared redundancy latch unit, each redundancy latch sharing group corresponds to at least two redundancy latch sections, and at least two redundancy latch sections share the at least one shared redundancy latch unit; and a redundancy decoder circuit, coupled to the redundancy latch circuit to receive a redundancy address, wherein the redundancy decoder circuit is configured to enable, in response to an addressing address matching the redundancy address, a corresponding redundancy signal line to address a redundancy memory resource in the memory.

20 Claims, 6 Drawing Sheets

(56) References Cited

U.S. PATENT DOCUMENTS

| | | | |
|---|---|---|---|
| 2008/0008024 A1* | 1/2008 | Mae | G11C 8/12 |
| | | | 365/230.06 |
| 2019/0311751 A1* | 10/2019 | Yoo | G06F 3/0659 |
| 2021/0132985 A1* | 5/2021 | Estlick | G06F 9/30116 |
| 2023/0368852 A1* | 11/2023 | Kitamura | G11C 16/10 |

FOREIGN PATENT DOCUMENTS

| | | |
|---|---|---|
| CN | 101563675 B | 4/2013 |
| CN | 106782666 A | 5/2017 |
| CN | 210956168 U | 7/2020 |
| CN | 212675921 U | 3/2021 |
| CN | 107527660 B | 6/2023 |
| JP | 2020013625 A | 1/2020 |
| KR | 20030066860 A | 8/2003 |

OTHER PUBLICATIONS

Chinese Notification to Grant Patent Right for Invention, Chinese Application No. 202310475399.8, mailed Oct. 20, 2025 (7 pages).

\* cited by examiner

REDUNDANCY LATCH DECODER CIRCUIT AND MEMORY

CROSS REFERENCE TO RELATED APPLICATION

The present application claims the priority of the Chinese patent application No. 202310475399.8, filed on Apr. 27, 2023, and the contents of which are incorporated herein by its entireties.

TECHNICAL FIELD

The present disclosure relates to the field of memories, and in particular to a redundancy latch decoder circuit and a memory.

BACKGROUND

In a process of manufacturing random memories, especially manufacturing a dynamic random access memory (DRAM) or a pseudo sram (PSRAM), a memory cell (MC) in a row direction or in a column direction may have a deficiency, and therefore, the defective MC may not perform storage operation properly. Therefore, in order to improve yield of the random memory, a spare circuit and a spare memory cell may be required to replace a damaged word line, a damaged bit line, and a damaged memory cell. The spare circuit and the spare memory cell are referred to as a redundancy (RDN) resource. Specifically, when the MC in the row direction has a deficiency, a row direction replacement, named as row redundancy, needs to be performed. When the MC in the column direction has a deficiency, a column direction replacement, named as column redundancy, needs to be performed.

Taking column redundancy as an example, replacement of a damaged bit line is achieved by replacing an abnormal column selection signal line. The random memory includes a memory array and a redundancy latch circuit. The memory array includes a plurality of memory sections. The redundancy latch circuit includes a plurality of redundancy latch sections corresponding to the plurality of memory sections. Each redundancy latch section is configured to latch an address of an abnormal column selection signal line in the corresponding memory section. However, a latch resource, which is in the redundancy latch sections but is not utilized by the corresponding memory section, results in a waste of the redundancy resource and a waste of an area of the circuit.

SUMMARY OF THE DISCLOSURE

According to a first aspect, the present disclosure provides a redundancy latch circuit, including a plurality of redundancy latch sections corresponding to a plurality of memory sections of the memory, wherein each of the plurality of redundancy latch sections comprises at least one normal redundancy latch unit, at least a portion of the plurality of redundancy latch sections is configured into at least one redundancy latch sharing group, each of the at least one redundancy latch sharing group comprises at least one shared redundancy latch unit, each of the at least one redundancy latch sharing group corresponds to at least two of the plurality of redundancy latch sections, and the at least two of the plurality of redundancy latch sections share at least one shared redundancy latch unit; and a redundancy decoder circuit, coupled to the redundancy latch circuit to receive a redundancy address, wherein the redundancy decoder circuit is configured to enable, in response to an addressing address matching the redundancy address, a corresponding redundancy signal line to address a redundancy memory resource in the memory.

According to a second aspect, the present disclosure provides a memory including the redundancy latch decoder circuit as described in the above.

BRIEF DESCRIPTION OF THE DRAWINGS

In order to illustrate the technical solutions in the embodiments of the present disclosure more clearly, the accompanying drawings for describing the embodiments are briefly described below. Apparently, the accompanying drawings in the following description are only some embodiments of the present disclosure, and any ordinary skilled person in the art may obtain other accompanying drawings based on these drawings without any creative work.

DETAILED DESCRIPTION

The technical solutions in the embodiments of the present disclosure will be clearly and completely described below by referring to the accompanying drawings in the embodiments of the present disclosure. It will be understood that the specific embodiments described herein are described for the purpose of explaining the present disclosure and do not limit the scope of the present disclosure. It is also to be noted that, for the purpose of description, the accompanying drawings show only a part of, but not all of, the entire structure relevant to the present disclosure. Based on the embodiments in the present disclosure, all other embodiments obtained without creative work by any ordinary skilled person in the art shall fall within the scope of the present disclosure.

The term "embodiment" herein means that particular features, structures or characteristics described in an embodiment may be included in at least one of other embodiments of the present disclosure. The presence of the term in various sections in the specification does not necessarily mean the same embodiment, nor is it a separate or alternative embodiment that is mutually exclusive with other embodiments. Any ordinary skilled person in the art shall understand that, both explicitly and implicitly, the embodiments described herein may be combined with other embodiments.

According to the present disclosure, a redundancy latch decoder circuit is provided and is applied to a memory. The circuit includes a redundancy latch circuit, and the redundancy latch circuit includes a plurality of redundancy latch sections corresponding to a plurality of memory sections of the memory. Each redundancy latch section includes at least one normal redundancy latch unit. At least a portion of the plurality of redundancy latch sections is configured to at least one redundancy latch sharing group. Each redundancy latch sharing group includes at least one shared redundancy latch unit. Each redundancy latch sharing group corresponds to at least two redundancy latch sections. At least two redundancy latch sections share the at least one shared redundancy latch unit. The redundancy latch decoder circuit further includes a redundancy decoder circuit, coupled to the redundancy latch circuit to receive a redundancy address. In response to the addressing address matching the redundancy address, the redundancy decoder circuit enables the corresponding redundancy signal line to address the redundancy memory resource in the memory. In this way, the shared redundancy latch unit in the redundancy latch circuit can be shared by at least two redundancy latch sections, such that the shared redundancy latch unit can be shared and utilized by at least two memory sections, the utilization rate of the redundancy resources may be improved, and the redundancy resources and the area of the circuit may be saved.

Figure 1:
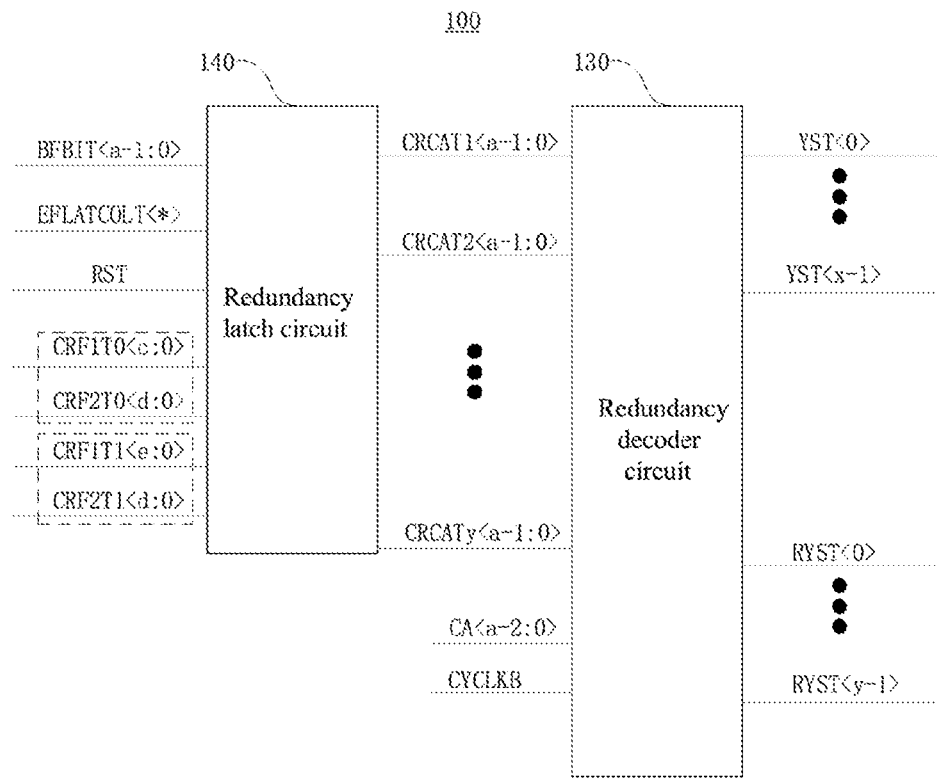
FIG. 1 is a structural schematic view of a redundancy latch decoder circuit according to an embodiment of the present disclosure.

FIG. 1 is a structural schematic view of a redundancy latch decoder circuit according to an embodiment of the present disclosure. The redundancy latch decoder circuit 100 is configured to latch a bad block address and to decode a redundancy address to activate a corresponding redundancy resource (such as a redundancy signal line). Further, the redundancy latch decoder circuit 100 is configured to perform addressing normally. It will be understood that, in a process of manufacturing random memories, especially manufacturing a DRAM, a memory cell (MC) in a row direction or in a column direction may have a deficiency, and therefore, the defective MC may not perform storage operation properly. Therefore, in order to improve yield of the random memory, a spare circuit and a spare memory cell may be required to replace a damaged word line, a damaged bit line, and a damaged memory cell. The spare circuit and the spare memory cell are referred to as a redundancy (RDN) resource. Specifically, when the MC in the row direction has a deficiency, a row direction replacement, named as row redundancy, needs to be performed. When the MC in the column direction has a deficiency, a column direction replacement, named as column redundancy, needs to be performed.

The redundancy latch decoder circuit 100 includes, but is not limited to, a redundancy latch circuit 140 and a redundancy decoder circuit 130. In the present embodiment, the redundancy latch circuit 140 may latch the bad block address and may output an address of a redundancy resource (such as a redundancy signal line), i.e., a redundancy address, corresponding to a memory section in which the currently activated word line (WL) is located. The redundancy decoder circuit 130 is configured to decode the redundancy address to activate a corresponding redundancy resource or to perform addressing normally. The redundancy address is the address of the redundancy resource (such as the redundancy signal line) corresponding to the memory section in which the currently activated word line (WL) is located. The redundancy latch decoder circuit 100 may be applied in row redundancy and in column redundancy. That is, the redundancy latch circuit 140 includes a column redundancy latch circuit and a row redundancy latch circuit. The redundancy decoder circuit 130 includes a column redundancy decoder circuit and a row redundancy decoder circuit. The redundancy signal line includes a redundancy column selection signal line and a redundancy row selection signal line. In the present embodiment, the redundancy latch decoder circuit 100 applied in column redundancy will be taken as an example.

Specifically, the redundancy latch circuit 140 includes a plurality of redundancy latch sections as mentioned in the above. Further, the redundancy latch circuit 140 receives the bad block address BFBIT<a-1:0>, memory section indication information EFLATCOLT<*>, and a reset signal RST, to latch the bad block address to a corresponding redundancy latch section in a bit-by-bit manner. Further, the bad block address BFBIT<a-1:0> is address information corresponding to a damaged memory resource in the row direction or in the column direction. The memory section indication information EFLATCOLT<*> is information of a memory section in which the bad block address is located. The bad block address BFBIT<a-1:0> and the memory section indication information EFLATCOLT<*> may be obtained by testing memory resources in the memory in advance, and may be stored in a programmable memory module (EFUSE). When the programmable memory module is powered up, the bad block address BFBIT<a-1:0> and the memory section indication information EFLATCOLT<*> are delivered to the redundancy latch circuit 140. The redundancy latch circuit 140 further receives a first set of selection signals CRFT0<*> and a second set of selection signals CRFT1<*> to output the redundancy address CRCAT<a-1:0> to the redundancy decoder circuit 130. The redundancy decoder circuit 130 is coupled to redundancy latch circuit 140 to receive the redundancy address CRCAT<a-1:0> (such as one of CRCAT1<a-1:0> to CRCATy<a-1:0> shown in in FIG. 1). In response to an addressing address CA<a-2:0> being matched with the redundancy address CRCAT<a-1:0> (the redundancy address CRCAT<a-1:0> includes information about whether the redundancy resource is normal, and therefore, the redundancy address has one more bit than the addressing address CA<a-2:0>), the redundancy decoder circuit 130 enables a corresponding redundancy signal line RYST to address a redundancy memory resource in the memory. The redundancy memory resource is configured to replace the damaged memory resource in the memory. In response to the addressing address CA<a-2:0> not matching the redundancy address CRCAT<a-1:0>, the redundancy decoder circuit 130 enables, based on the addressing address CA<a-2:0>, the corresponding normal signal line YST to address a normal memory resource in the memory. The redundancy decoder circuit 130 further receives a clock signal CYCLKB to decode the addressing address CA<a-2:0> under the control of the clock signal CYCLKB, to enable the corresponding normal signal line YST.

Figure 3:
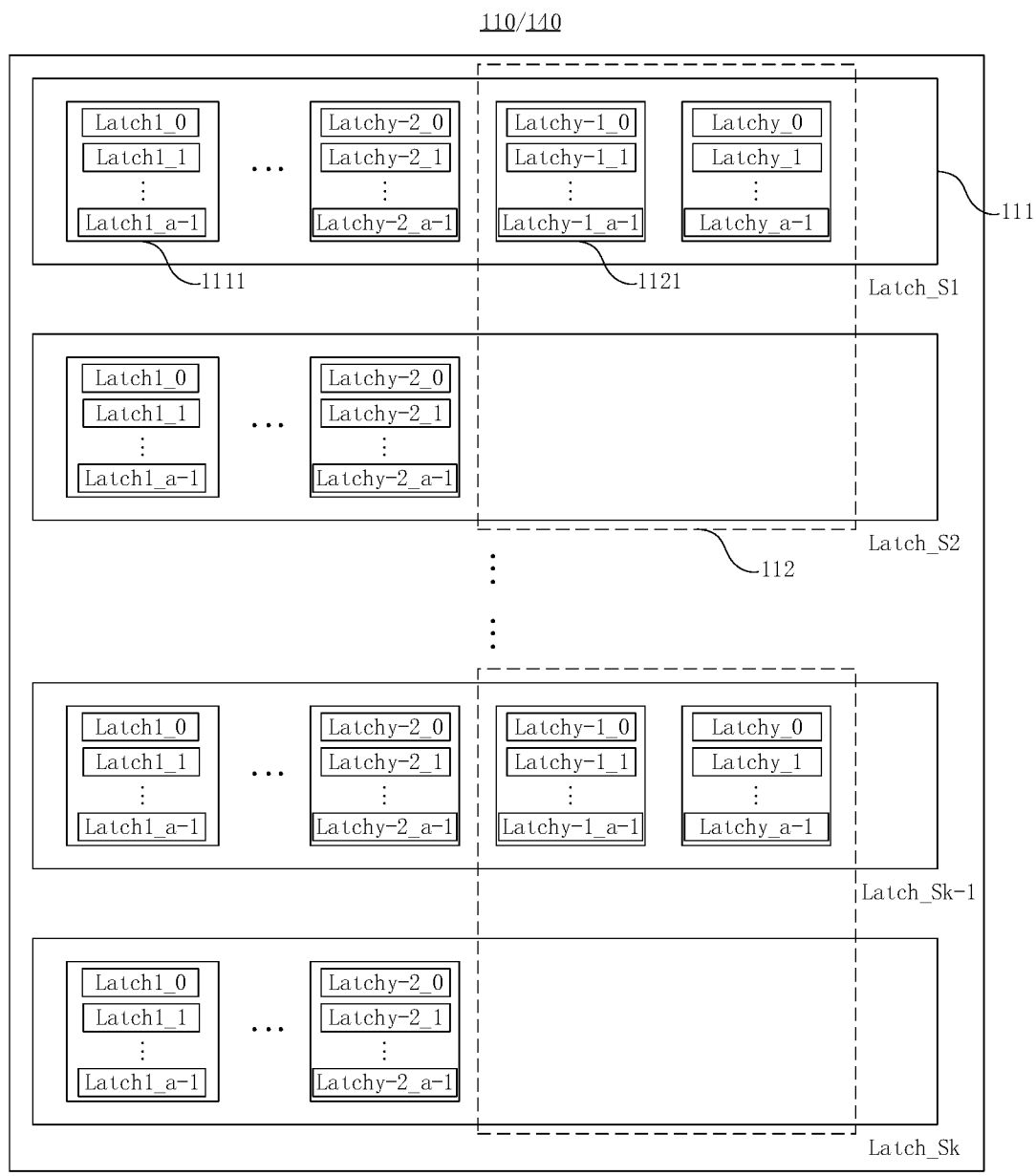
FIG. 3 is a structural schematic view of a redundancy latch array or a redundancy latch circuit according to an embodiment of the present disclosure.
Figure 4:
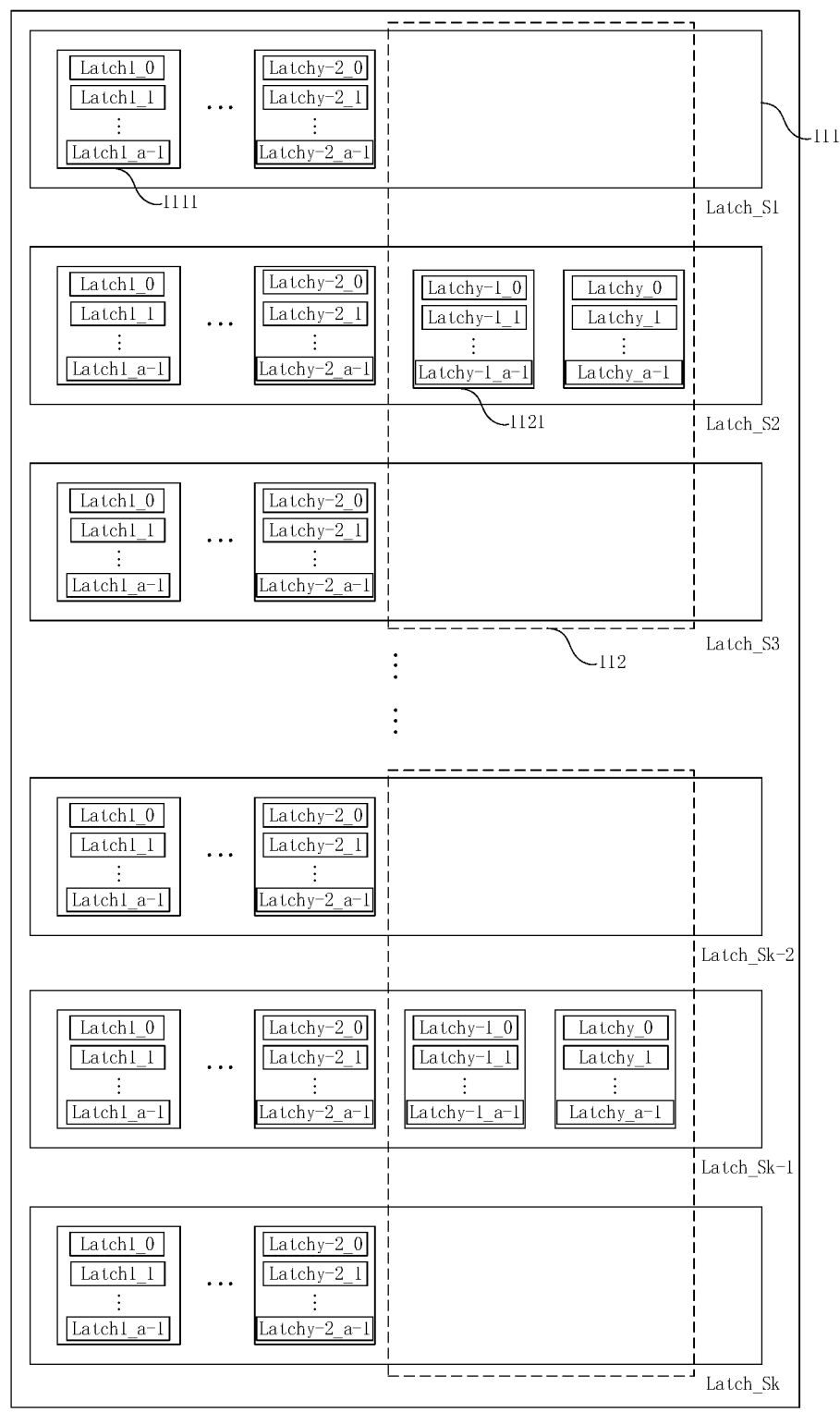
FIG. 4 is a structural schematic view of a redundancy latch array or a redundancy latch circuit according to another embodiment of the present disclosure.

As shown in FIG. 1, FIG. 3, and FIG. 4, FIG. 3 is a structural schematic view of a redundancy latch array or a redundancy latch circuit according to an embodiment of the present disclosure, and FIG. 4 is a structural schematic view of a redundancy latch array or a redundancy latch circuit according to another embodiment of the present disclosure. For example, the redundancy latch circuit 140 shown in FIG. 1 includes a plurality of redundancy latch sections 111 corresponding to a plurality of memory sections of the memory. Each of the plurality of redundancy latch sections 111 includes at least one normal redundancy latch unit 1111. At least a portion of the plurality of redundancy latch sections 111 is configured into at least one redundancy latch sharing group 112. Each of the at least one redundancy latch sharing group 112 includes at least one shared redundancy latch unit 1121. Each redundancy latch sharing group 112 corresponds to at least two of the plurality of redundancy latch sections 111. At least two of the plurality of redundancy latch sections 111 share at least one shared redundancy latch unit 1121. In this way, the shared redundancy latch unit 1121 in the redundancy latch circuit 100 can be shared by at least two redundancy latch sections 111, such that the shared redundancy latch unit 1121 can be shared and used by at least two memory sections to store the redundancy address, the utilization rate of the redundancy resources is improved, and the redundancy resources and the area of the circuit are saved.

Figure 2:
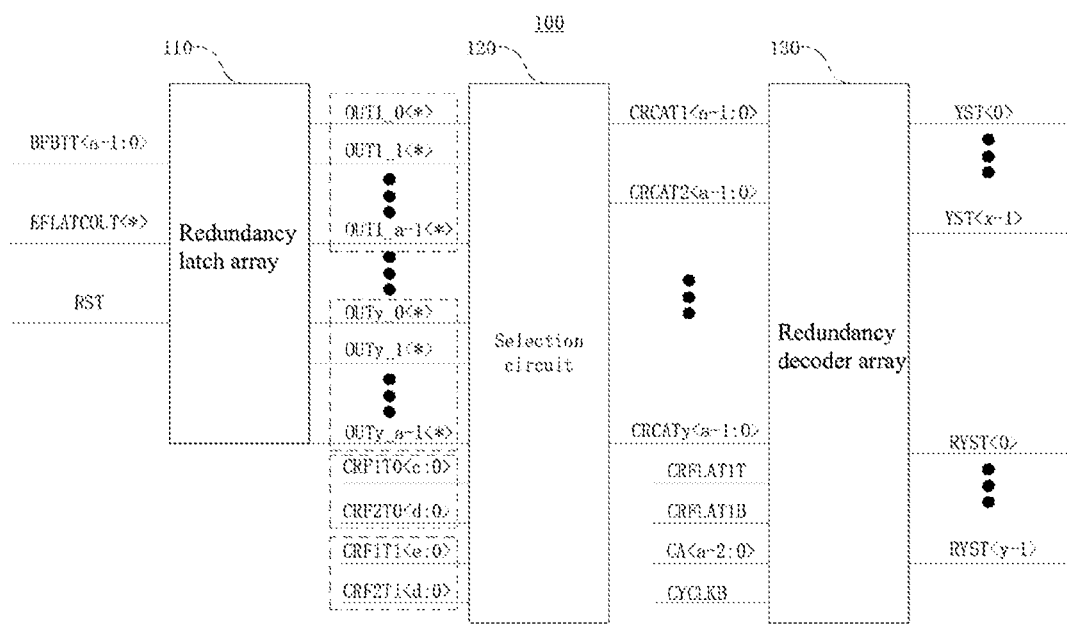
FIG. 2 is a structural schematic view of a redundancy latch decoder circuit according to another embodiment of the present disclosure.

FIG. 2 is a structural schematic view of a redundancy latch decoder circuit according to another embodiment of the present disclosure. The redundancy latch decoder circuit 100 is configured to latch the bad block address and to decode the redundancy address to activate the corresponding redundancy resource (such as a redundancy signal line). Further, the redundancy latch decoder circuit 100 is configured to perform addressing normally. It will be understood that, in a process of manufacturing random memories, especially manufacturing a DRAM or a PSRAM, a memory cell (MC) in a row direction or in a column direction may have a deficiency, and therefore, the defective MC may not perform storage operation properly. Therefore, in order to improve yield of the random memory, a spare circuit and a spare memory cell may be required to replace a damaged word line, a damaged bit line, and a damaged memory cell. The spare circuit and the spare memory cell are referred to as a redundancy (RDN) resource. Specifically, when the MC in the row direction has a deficiency, a row direction replacement, named as row redundancy, needs to be performed. When the MC in the column direction has a deficiency, a column direction replacement, named as column redundancy, needs to be performed.

The redundancy latch decoder circuit 100 may include, but is not limited to, a redundancy latch array 110, a selection circuit 120, and a redundancy decoder circuit 130. The redundancy latch circuit 140 includes the redundancy latch array 110 and the selection circuit 120. The plurality of redundancy latch sections 111 shown in FIG. 1 cooperatively serve form the redundancy latch array 110, configured to latch the bad block address in a bitwise manner. The selection circuit 120 is configured to select, from all bad block addresses, the bad block address corresponding to the memory section in which the currently activated WL is located. The redundancy decoder circuit 130 is configured to decode the redundancy address (such as the address of a redundancy signal line) to activate the corresponding redundancy resource (such as the redundancy signal line) or to perform addressing normally. The redundancy address corresponds to the bad block address corresponding to the memory section in which the currently activated WL is located. The redundancy latch decoder circuit 100 may be applied in row redundancy and in column redundancy. That is, the redundancy latch circuit 140 includes a column redundancy latch circuit and a row redundancy latch circuit. The redundancy decoder circuit 130 includes a column redundancy decoder circuit and a row redundancy decoder circuit. The redundancy signal lines include a redundancy column selection signal line (or a redundancy bit line) and a redundancy row selection signal line (or a redundancy word line). In the present embodiment, the redundancy latch decoder circuit 100 applied in column redundancy will be taken as an example.

As shown in FIG. 2, FIG. 3, and FIG. 4, the redundancy latch array 110 includes a plurality of redundancy latch sections 111 corresponding to a plurality of memory sections of the memory. Each redundancy latch section 111 includes at least one normal redundancy latch unit 1111. At least a portion of the plurality of redundancy latch sections 111 is configured into at least one redundancy latch sharing group 112. Each redundancy latch sharing group 112 includes at least one shared redundancy latch unit 1121. Each redundancy latch sharing group 112 corresponds to at least two redundancy latch sections 111. The at least two redundancy latch sections 111 corresponding to the redundancy latch sharing group 112 may share the at least one shared redundancy latch unit 1121 in the redundancy latch sharing group 112. In this way, the utilization rate of the redundancy latch units is improved, and the redundancy resources and the area of the circuit are increased. In the present embodiment, at least one shared redundancy latch unit 1121 is arranged in one of the at least two redundancy latch sections 111 corresponding to the redundancy latch sharing group 112. The rest of the at least two redundancy latch sections 111 corresponding to the redundancy latch sharing group 112 share the at least one shared redundancy latch unit 1121. In other embodiments, the at least one shared redundancy latch unit 1121 may be dispersed in the at least two redundancy latch sections 111. The at least two redundancy latch sections 111 corresponding to the redundancy latch sharing group 112 share the at least one shared redundancy latch unit 1121.

Figure 7:
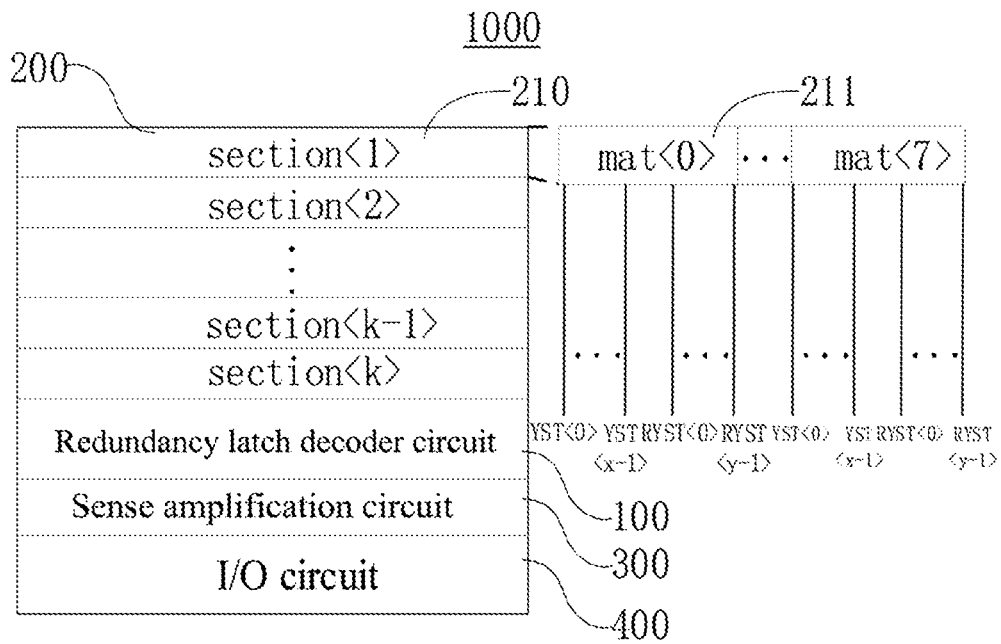
FIG. 7 is a structural schematic view of a memory according to an embodiment of the present disclosure.

Further, as shown in FIG. 3 and FIG. 7, FIG. 7 is a structural schematic view of a memory according to an embodiment of the present disclosure. In an embodiment, the redundancy latch array 110 includes k redundancy latch sections 111 corresponding to k memory sections of the memory. Specifically, the redundancy latch array 110 includes a redundancy latch section Latch_S1 to a redundancy latch section Latch_Sk. In the present embodiment, the k is a positive integer greater than 1 and is a multiple of 6. In other embodiments, the k may be any positive integer greater than 1. Each redundancy latch sharing group 112 corresponds to two adjacent redundancy latch sections 111. Each redundancy latch section 111 includes n normal redundancy latch units 1111, and the n is a positive integer. In the present embodiment, the n may be equal to y−2, and the y is a positive integer greater than 2. Any redundancy latch sharing group 112 includes m shared redundancy latch units 1121. The m shared redundancy latch units 1121 are arranged in one of the two adjacent redundancy latch sections 111. The m is a positive integer. In the present embodiment, the m may be equal to 2. The other one of the two redundancy latch sections 111 corresponding to the redundancy latch sharing group 112 may share the m shared redundancy latch units 1121. Each redundancy latch section 111 that corresponds to any one memory section is configured to include (n+m) redundancy latch units. In the present embodiment, n+m is equal to y. The normal redundancy latch unit 1111 and the shared redundancy latch unit 1121, i.e., the redundancy latch unit, includes a latch blocks. Specifically, the redundancy latch unit includes a latch block Latch1_0 to a latch block Latch1_a-1. The a latch blocks correspond to a bits of the bad block address, respectively, and are configured to latch the address bits of the bad block addresses.

For example, a damaged memory resource is present in a memory section<1>. In this case, an address of the damaged memory resource (a bad block address) may be latched in any of the normal redundancy latch units 1111 in the redundancy latch section Latch_S1 of the corresponding memory section<1> or latched in any of the redundancy latch units 1121 in the shared redundancy latch share group 112 in which the redundancy latch section Latch_S1 is located. Similarly, a damaged memory resource is present in a memory section<2>. In this case, an address of the damaged memory resource (a bad block address) may be latched in any of the normal redundancy latch units 1111 in the redundancy latch section Latch_S2 of the corresponding memory section<2> or latched in any of the redundancy latch units 1121 in the shared redundancy latch share group 112 in which the redundancy latch section Latch_S2 is located. In this way, each of the redundancy latch section Latch_S1 and the redundancy latch section Latch_S2 is configured to include (n+m) redundancy latch units (n normal redundancy latch units 1111 and m shared redundancy latch units 1121). In this way, the number of redundancy latch units that can be utilized in the memory section<1> and in the memory section<2> is not reduced (with respect to each redundancy latch section being configured with n+m normal redundancy latch units). However, the overall number of redundancy latch units is reduced, such that the area of the circuit is reduced. In the present embodiment, compared to the case that each redundancy latch section is configured with ntm normal redundancy latch units, (k/2*m) redundancy latch units may be saved.

In other embodiments, the m shared redundancy latch units 1121 included in each redundancy latch sharing group 112 may be dispersed in the two adjacent redundancy latch sections 111 corresponding to the redundancy latch sharing group 112. For example, when m=2, one shared redundancy latch unit 1121 is arranged in the redundancy latch section Latch_S1, and the other shared redundancy latch unit 1121 is arranged in the redundancy latch section Latch_S2.

Further, as shown in FIG. 4 and FIG. 7, in another embodiment, the redundancy latch array 110 includes k redundancy latch sections 111 corresponding to k memory sections of the memory. Specifically, the redundancy latch array 110 includes a redundancy latch section Latch_S1 to a redundancy latch section Latch_Sk. In the present embodiment, the k is a positive integer greater than 1 and is a multiple of 6. In other embodiments, the k may be any positive integer greater than 1. Each redundancy latch sharing group 112 corresponds to three adjacent redundancy latch sections 111. Each redundancy latch section 111 includes n normal redundancy latch units 1111, and the n is a positive integer. In the present embodiment, the n may be equal to y−2, and the y is a positive integer greater than 2. Any redundancy latch sharing group 112 includes m shared redundancy latch units 1121, and the m shared redundancy latch units 1121 are arranged in one of the three adjacent redundancy latch sections 111. The m is a positive integer. In the present embodiment, the m may be equal to 2. The rest of the three redundancy latch sections 111 corresponding to the redundancy latch sharing group 112 may share the m shared redundancy latch units 1121. The redundancy latch section 111 corresponding to any memory section is configured to include (n+m) redundancy latch units. In the present embodiment, the n+m is equal to y. The normal redundancy latch units 1111 and the shared redundancy latch units 1121, i.e., the redundancy latch unit, includes a latch blocks. Specifically, the redundancy latch unit includes a latch block Latch1_0 to a latch block Latch1_a-1. The a latch blocks correspond to a bits of the bad block address, respectively, and are configured to latch the address bits of the bad block address.

For example, a damaged memory resource is present in a memory section<1>. In this case, an address of the damaged memory resource (a bad block address) may be latched in any of the normal redundancy latch units 1111 in the redundancy latch section Latch_S1 of the corresponding memory section<1> or latched in any of the redundancy latch units 1121 in the shared redundancy latch sharing group 112 in which the redundancy latch section Latch_S1 is located. Similarly, a damaged memory resource is present in a memory section<2>. In this case, an address of the damaged memory resource (a bad block address) may be latched in any of the normal redundancy latch units 1111 in the redundancy latch section Latch_S2 of the corresponding memory section<2> or latched in any of the redundancy latch units 1121 in the shared redundancy latch share group 112 in which the redundancy latch section Latch_S2 is located. Similarly, a damaged memory resource is present in a memory section<3>. In this case, an address of the damaged memory resource (a bad block address) may be latched in any of the normal redundancy latch units 1111 in the redundancy latch section Latch_S3 of the corresponding memory section<3> or latched in any of the redundancy latch units 1121 in the shared redundancy latch share group 112 in which the redundancy latch section Latch_S3 is located. In this way, each of the redundancy latch section Latch_S1, the redundancy latch section Latch_S2, and the redundancy latch section Latch_S3 is configured to include (n+m) redundancy latch units (n normal redundancy latch units 1111 and m shared redundancy latch units 1121). In this way, the number of redundancy latch units that can be utilized in the memory section<1>, in the memory section<2>, and in the redundancy latch section Latch_S3, is not reduced (with respect to each redundancy latch section being configured with n+m normal redundancy latch units). However, the overall number of redundancy latch units is reduced, such that the area of the circuit is reduced. In the present embodiment, compared to the case that each redundancy latch section is configured with n+m normal redundancy latch units, (k/3*2m) redundancy latch units may be saved.

In other embodiments, the m shared redundancy latch units 1121 included in each redundancy latch sharing group 112 may be dispersed in the three adjacent redundancy latch sections 111 corresponding to the redundancy latch sharing group 112. For example, with m=2, one shared redundancy latch unit 1121 is arranged in the redundancy latch section Latch_S1, and the other shared redundancy latch unit 1121 is arranged in the redundancy latch section Latch_S3.

As shown in FIG. 2, the redundancy latch array 110, which includes the plurality of redundancy latch sections 111, receives the bad block address BFBIT<a-1:0>, the memory section indication message EFLATCOLT<*>, and the reset signal RST, to latch the bad block address to the corresponding redundancy latch section 111 in a bitwise manner. The bad block address BFBIT<a-1:0> refers to address information corresponding to the damaged memory resource in the row direction or in the column direction. The memory section indication information EFLATCOLT<*> refers to information of the memory section in which the bad block address is located. The bad block address BFBIT<a-1:0> and the memory section indication EFLATCOLT<*> can be obtained by testing the memory resource in the memory in advance, and may be stored in the programmable memory module (EFUSE). When the programmable memory module is powered up, the bad block address BFBIT<a-1:0> and the memory section indication information EFLATCOLT<*> are delivered to the redundancy latch array 110.

The selection circuit 120 is coupled to the redundancy latch array 110 to receive address bits. The selection circuit 120 further receives a first set of selection signals CRFT0<*> and a second set of selection signals CRFT1<*>. The selection circuit 120 determines, based on the first set of selection signals CRFT0<*>, a current redundancy latch section corresponding to a current operation memory section to selectively output a first redundancy address, which is formed by combining the address bits latched by the normal redundancy latch units 1111 in the current redundancy latch section. The current operation memory section is a memory section in which the currently activated WL is located. The selection circuit 120 determines, based on the second set of selection signals CRFT1<*>, a current redundancy latch sharing group corresponding to the current redundancy latch section to selectively output a second redundancy address, which is formed by combining the address bits latched by the shared redundancy latch units 1121 corresponding to the current redundancy latch sharing group. The current redundancy latch sharing group is a redundancy latch sharing group in which the current redundancy latch section is located. The redundancy address includes the first redundancy address and the second redundancy address.

Further, the first set of selection signals CRFT0<*> includes a plurality of first selection signals, such as including a first selection signal CRF1T0<c: 0> and a first selection signal CRF2T0<d:0>, and each of the c and the d is a positive integer greater than 0. The plurality of first selection signals cooperate with each other to select the current redundancy latch section from the plurality of redundancy latch sections 111. The second set of selection signals CRFT1<*> includes a plurality of second selection signals, such as including a second selection signal CRF1T1<e:0> and a second selection signal CRF2T1<d:0>, and the e is a positive integer greater than 0. The plurality of second selection signals cooperate with each other to select, from the at least one redundancy latch sharing group 112, the current redundancy latch sharing group in which the current redundancy latch section is located.

Specifically, as shown in FIG. 2 and FIG. 3, the redundancy latch sharing group 112 corresponding to two adjacent redundancy latch sections 111 will be taken as an example. In this case, k redundancy latch sections 111 and k/2 redundancy latch sharing groups 112 are present. The first set of selection signals CRFT0<*> may include the first selection signal CRF1T0<c:0> and the first selection signal CRF2T0<d:0>. The second set of selection signals CRFT1<*> may include the second selection signal CRF1T1<e:0> and the second selection signal CRF2T1<d: 0>. The first selection signal CRF1T0<c: 0> and the first selection signal CRF2T0<d:0> cooperate with each other to select the current redundancy latch section from the k redundancy latch sections 111. (c+1)*(d+1)=k combinations may be obtained by combining the first select signal CRF1T0<c: 0> with the first select signal CRF2T0<d:0> to select the current redundancy latch section from the k redundancy latch sections 111. The second select signal CRF1T1<e:0> and the second select signal CRF2T1<d:0> cooperate with each other to select, the from k/2 redundancy latch sharing groups 112, the current redundancy latch sharing group in which the current redundancy latch section is located. (e+1)*(d+1)=k/2 combinations may be obtained by combining the second select signal CRF1T1<e:0> with the second select signal CRF2T1<d:0> to select, from the k/2 redundancy latch sharing groups 112, the current redundancy latch sharing group in which the current redundancy latch section is located.

In the above embodiment, the bad block address information (address bits) input, by the redundancy latch array 110, to the selection circuit 120 includes: OUT1_(a-1:0)<k: 1> to OUTy-2_(a-1:0)<k: 1>, and OUTy-1_(a-1:0)<k/2:1> to OUTy_(a-1:0)<k/2:1>. The bad block address information OUT1_(a-1:0)<k: 1> to OUTy-2_(a-1:0)<k: 1> corresponds to address bits of the bad block address latched by the normal redundancy latch unit 1111 in the k redundancy latch sections 111. A first set of bad block address information OUT1_(a-1:0)<k: 1> includes OUT1_0<k: 1> to OUT1 a-1<k: 1>, wherein the OUT1_0<k: 1> corresponds to a first address bit of the bad block address latched by each latch block Latch1_0 in the k redundancy latch sections 111, and the rest can be done in the similar manner, i.e., OUT y-2_a-1<k: 1> corresponds to the a-th address bit of the bad block address of each latch block Latchy-2_a-1 in the k redundancy latch sections 111. For example, when the first selection signal CRF1T0<0> and the first selection signal CRF2T0<0> are valid, and that is, when a first piece of k pieces of the bad block address information is selected, the bad block address information OUT1_(a-1:0)<1> to OUTy-2_(a-1:0)<1> is selected in the selection circuit 120 and is recombined to form the first redundancy address CRCAT (y-2:1)_<a-1:0>. The first redundancy address CRCAT(y-2:1)_<a-1:0> is output to the redundancy decoder circuit 130. The rest can be done in the similar manner. The first redundancy address CRCAT(y-2:1)_<a-1:0> includes y-2 first redundancy addresses, i.e., the first redundancy address CRCAT1<a-1:0> to the first redundancy address CRCATy-2_<a-1:0>.

Similarly, the bad block address information OUTy-1_(a-1:0)<k/2:1> to OUTy_(a-1:0)<k/2:1> corresponds to address bits of the bad block addresses latched by the shared redundancy latch units 1121 in the k/2 redundancy latch sharing groups 112. The bad block address information OUTy-1_(a-1:0)<k/2:1> includes OUTy-1_0<k/2:1> to OUTy-1_a-1<k/2:1>. The OUTy-1_0<k/2:1> corresponds to the first address bit of the bad block address of each latch block Latchy-1_0 in the k/2 redundancy latch sharing groups 112, ..., and the OUTy_a-1<k/2:1> corresponds to the a-th address bit of the bad block address latched by each latch block Latchy_a-1 in the k/2 redundancy latch sharing groups 112. For example, when the second selection signal CRF1T1<0> and the second selection signal CRF2T1<0> are valid, and that is, when the first piece of the k/2 pieces of the bad block address information is selected, the bad block address information OUTy-1_(a-1:0)<1> to OUTy_(a-1:0)<1> is selected in the selection circuit 120 and is recombined to form the second redundancy address CRCAT (y:y-1)_<a-1:0>. The second redundancy address CRCAT (y:y-1)_<a-1:0> is output to the redundancy decoder circuit 130. The rest can be done in the similar manner. The second redundancy address CRCAT (y:y-1)_<a-1:0> includes two second redundancy addresses, i.e., the second redundancy address CRCATy-1_<a-1:0> to the second redundancy address CRCATy_<a-1:0>.

Specifically, as shown in FIG. 2 and FIG. 4, the redundancy latch sharing group 112 corresponding to three adjacent redundancy latch sections 111 will be taken as an example. In this case, k redundancy latch sections 111 and k/3 redundancy latch sharing groups 112 are present. The first set of selection signals CRFT0<*> may include a first selection signal CRF1T0<c:0> and a first selection signal CRF2T0<d:0>. The second set of selection signals CRFT1<*> may include a second selection signal CRF1T1<e:0> and a second selection signal CRF2T1<d:0>. The first selection signal CRF1T0<c:0> and the first selection signal CRF2T0<d:0> cooperate with each other to select the current redundancy latch section from the k redundancy latch sections 111. (c+1)*(d+1)=k combinations may be obtained by combining the first select signal CRF1T0<c:0> and the first select signal CRF2T0<d:0> to select the current redundancy latch section from the k redundancy latch sections 111. The second select signal CRF1T1<e:0> and the second select signal CRF2T1<d:0> are combined to select, from the k/3 redundancy latch sharing groups 112, the current redundancy latch sharing group in which the current redundancy latch section is located. (e+1)*(d+1)=k/3 combinations may be obtained by combining the second select signal CRF1T1<e:0> and the second select signal CRF2T1<d:0> to select, from the k/3 redundancy latch sharing groups 112, the current redundancy latch sharing group in which the current redundancy latch section is located.

In the above embodiment, the bad block address information (address bits) input, by the redundancy latch array 110, to the selection circuit 120 includes: OUT1_(a-1:0)<k:1> to OUTy-2_(a-1:0)<k:1>, and OUTy-1_(a-1:0)<k/3:1> to OUTy_(a-1:0)<k/3:1>. The bad block address information OUT1_(a-1:0)<k:1> to OUTy-2_(a-1:0)<k:1> corresponds to address bits of the bad block addresses latched by the normal redundancy latch unit 1111 in the k redundancy latch sections 111. The first set of bad block address information OUT1_(a-1:0)<k:1> includes OUT1_0<k:1> to OUT1_a-1<k:1>, wherein the OUT1_0<k:1> corresponds to the first address bit of the bad block address latched by each latch block Latch1_0 in the k redundancy latch sections 111, and the rest can be done in the similar manner, i.e., The OUT y-2_a-1<k:1> corresponds to the a-th address bit of the bad block address latched by each latch block Latchy-2_a-1 in the k redundancy latch sections 111. For example, when the first selection signal CRF1T0<0> and the first selection signal CRF2T0<0> are valid, and that is, when the first piece of k pieces of the bad block address information is selected, the bad block address information OUT1_(a-1:0)<1> to OUTy-2_(a-1:0)<1> is selected in the selection circuit 120 and is recombined to form the first redundancy address CRCAT(y-2:1)_<a-1:0>. The first redundancy address CRCAT(y-2:1)_<a-1:0> is output to the redundancy decoder circuit 130. The rest can be done in the similar manner. The first redundancy address CRCAT(y-2:1)_<a-1:0> includes y-2 first redundancy addresses, i.e., a first redundancy address CRCAT1_<a-1:0> to a first redundancy address CRCATy-2_<a-1:0>.

Similarly, the bad block address information OUTy-1_(a-1:0)<k/3:1> to OUTy_(a-1:0)<k/3:1> corresponds to address bits of the bad block addresses latched by the shared redundancy latch units 1121 in the k/3 redundancy latch sharing groups 112. The bad block address information OUTy-1_(a-1:0)<k/3:1> includes OUTy-1_0<k/3:1> to OUTy-1_a-1<k/3:1>, wherein the OUTy-1_0<k/3:1> corresponds to the first address bit of the bad block address latched by each latch block Latchy-10 in the k/3 redundancy latch sharing groups 112, and the rest can be done in the similar manner. When the second selection signal CRF1T1<0> and the second selection signal CRF2T1<0> are valid, the bad block address information OUTy-1_(a-1:0)<1> to OUTy_(a-1:0)<1> is selected in the selection circuit 120 and is recombined to form a second redundancy address CRCAT(y:y-1)_<a-1:0>. The second redundancy address CRCAT(y:y-1)_<a-1:0> is output to the redundancy decoder circuit 130. The rest can be done in the similar manner. The second redundancy address CRCAT (y:y-1)_<a-1:0> includes two second redundancy addresses, i.e., a second redundancy address CRCATy-1_<a-1:0> to a second redundancy address CRCATy_<a-1:0>.

As shown in FIG. 2, the redundancy decoder circuit 130 is coupled to the selection circuit 120. While performing the addressing operation, the redundancy decoder circuit 130 compares the addressing address (e.g. CA<a-2:0>) to each of the first redundancy address (such as, y-2 first redundancy addresses CRCAT(y-2:1)_<a-1:0>) and the second redundancy address (such as two second redundancy addresses CRCAT(y:y-1)_<a-1:0>). In response to the addressing address being matched with any one of the first redundancy addresses and the second redundancy addresses, the redundancy decoder circuit 130 enables the corresponding redundancy signal line to address the redundancy resource in the memory.

Specifically, as shown in FIG. 2, FIG. 3, and FIG. 4, the redundancy decoder circuit 130 being applied in column redundancy will be taken as an example. The redundancy signal lines include a redundancy column selection signal line RYST. The normal signal lines include a normal column selection signal line YST. The addressing address includes a column addressing address CA<a-2:0>. For example, each redundancy latch section 111 includes y-2 normal redundancy latch units 1111, and each redundancy latch sharing group 112 includes two shared redundancy latch units 1121. The first redundancy address includes CRCAT(y-2:1)_<a-1:0>, and specifically includes the first redundancy address CRCAT1_<a-1:0> to the first redundancy address CRCATy-2_<a-1:0>. The second redundancy address includes CRCAT(y:y-1)_<a-1:0>, specifically includes the second redundancy address CRCATy-1_<a-1:0> to the second redundancy address CRCATy_<a-1:0>. While performing the addressing operation, the redundancy decoder circuit 130 compares the addressing address CA<a-2:0> to each of the first redundancy address CRCAT(y-2:1)_<a-1:0> and the second redundancy address CRCAT(y:y-1)_<a-1:0>. In response to the addressing address CA<a-2:0> being matched with either of the first redundancy address CRCAT (y-2:1)_<a-1:0> or the second redundancy address CRCAT (y:y-1)_<a-1:0>, the redundancy decoder circuit 130 enables the corresponding redundancy signal line RYST to address the redundancy memory resource in the memory.

Figure 5:
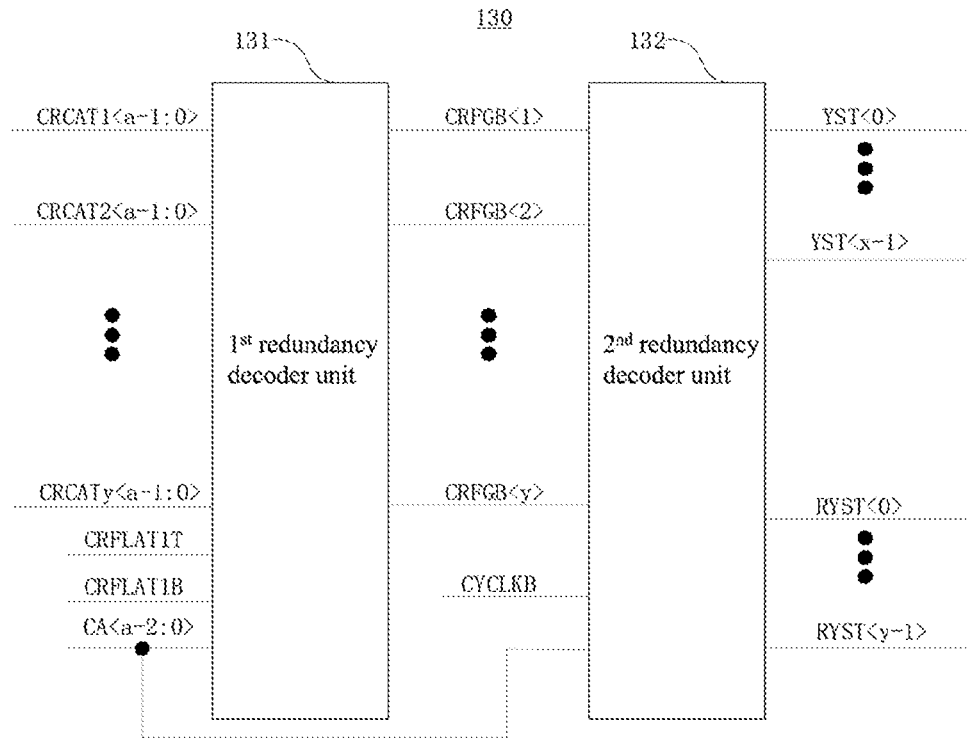
FIG. 5 is a structural schematic view of a redundancy decoder circuit according to an embodiment of the present disclosure.

As shown in FIG. 2 and FIG. 5, FIG. 5 is a structural schematic view of a redundancy decoder circuit according to an embodiment of the present disclosure. The redundancy decoder circuit 130 includes a first redundancy decoder unit 131 and a second redundancy decoder unit 132. The first redundancy decoder unit 131 is coupled to the selection circuit 120 and receives the addressing address CA<a-2:0>. While performing the addressing operation, the first redundancy decoder unit 131 compares the addressing address CA<a-2:0> to each of the first redundancy address CRCAT (y-2:1)_<a-1:0> and the second redundancy address CRCAT(y:y-1)_<a-1:0> and generates a corresponding redundancy enabling signal CRFGB<*> in response to the addressing address CA<a-2:0> being matched with either of the first redundancy address CRCAT(y-2:1)_<a-1:0> and the second redundancy address CRCAT(y:y-1)_<a-1:0>. The redundancy enabling signal CRFGB<*> includes y redundancy enabling signals (corresponding to y redundancy signal lines respectively), corresponding to a redundancy enabling signal CRFGB<y-2:1> of the first redundancy address and a redundancy enabling signal CRFGB<y:y−1> of the second redundancy address. The second redundancy decoder unit 132 is coupled to the first redundancy decoder unit 131 and receives the addressing address CA<a-2:0>. While performing the addressing operation, in response to the first redundancy decoder unit 131 generating the corresponding redundancy enabling signal CRFGB<*>, the second redundancy decoder unit 132 masks the addressing address CA<a-2:0> and enables the corresponding redundancy signal line RYST based on the redundancy enabling signal CRFGB<*> to address the corresponding redundancy memory resource in the memory. In response to the first redundancy decoder unit 131 not generating the corresponding redundancy enabling signal CRFGB<*>, the second redundancy decoder unit 132 enables the corresponding normal signal line YST based on the addressing address CA<a-2:0> to normally address the corresponding normal memory resource in the memory. In the present embodiment, the number of normal signal lines YST is x, including a normal signal line YST<0> to a normal signal lines YST<x-1>. The number of redundancy signal lines RYST is y, including a redundancy signal line RYST<0> to a redundancy signal line RYST<y-1>. In response to one of the y redundancy enabling signals CRFGB<*> being set, the second redundancy decoder unit 132 enables one of the corresponding y redundancy signal lines RYST. In response to none of the y redundancy enabling signals CRFGB<*> being set, the second redundancy decoder unit 132 enables one of the corresponding x normal signal lines YST based on the addressing address CA<a-2:0>.

Specifically, in the first redundancy decoder unit 131, the addressing address CA<a-2:0> is compared to the redundancy address CRCAT<a-1:0> bit by bit to obtain first redundancy enabling information CRFB<a-2:0>. The redundancy address CRCAT<a-1:0> includes a first redundancy address CRCAT(y−2:1)_<a-1:0> and a second redundancy address CRCAT(y:y−1)_<a-1:0>. The redundancy address CRCAT<a-1:0> has one more bit of CRCAT<a-1> than the addressing address CA<a-2:0>. The CRCAT<a-1> is configured to indicate whether the addressed redundancy resource is normal. ~CRCAT<a-1> is an inverted signal of the CRCAT<a-1>. The second redundancy enabling information is set to be CRET=~CRCAT<a-1>^CRCAT<0>. The first redundancy enabling information CRFB<a-2:0> and the second redundancy enabling information CRET are combined with each other to obtain the redundancy enabling signal CRFGB<*>. When both the first redundancy enabling information CRFB<a-2:0> and the second redundancy enabling information CRET are valid, the redundancy enabling signal CRFGB<*> is valid.

In some embodiments, the first redundancy decoder unit 131 further receives a first timing signal CRFLAT1T and a second timing signal CRFLAT1B to sample and latch the addressing address CA<a-2:0> within a limited period of time, such that the first redundancy decoder unit 131 is not affected by fluctuation of the addressing address CA<a-2:0> while the first redundancy decoder unit 131 comparing the redundancy address CRCAT<a-1:0> to the addressing address CA<a-2:0>. The second redundancy decoder unit 132 further receives a clock signal CYCLKB to decode the addressing address CA<a-2:0> under the control of the clock signal CYCLKB to enable a corresponding normal signal line YST.

Figure 6:
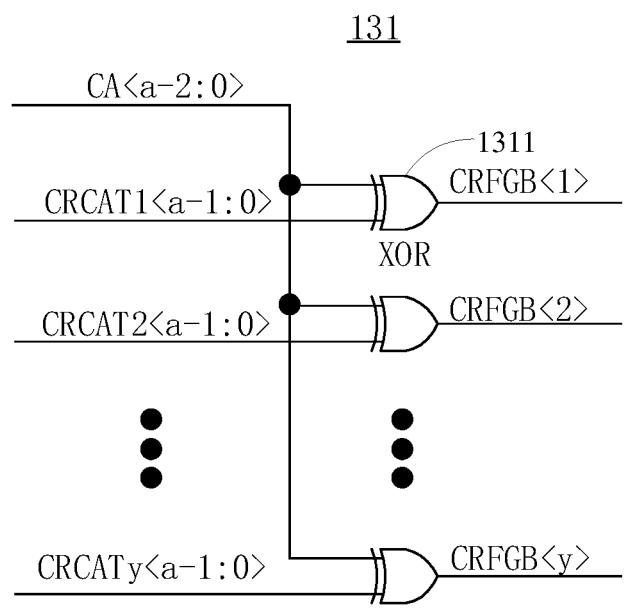
FIG. 6 is a structural schematic view of a first redundancy decoder unit according to an embodiment of the present disclosure.

As shown in FIG. 5 and FIG. 6, FIG. 6 is a structural schematic view of a first redundancy decoder unit according to an embodiment of the present disclosure. The first redundancy decoder unit 131 includes a plurality of logic gate circuits 1311. Each logic gate circuit receives the addressing address CA<a-2:0> and one of the first redundancy address CRCAT(y−2:1)_<a-1:0> and the second redundancy address CRCAT(y:y−1)_<a-1:0>, such that each logic gate circuit compares the addressing address CA<a-2:0> to the received one of the first redundancy address CRCAT(y−2:1)_<a-1:0> and the second redundancy address CRCAT(y:y−1)_<a-1:0>. The logic gate circuit 1311 includes a logic exclusive or (XOR) gate circuit.

The present disclosure provides a redundancy latch decoder circuit 100, applied in a memory. The redundancy latch decoder circuit 100 includes the redundancy latch circuit 140. The redundancy latch circuit 140 includes the plurality of redundancy latch sections 111 corresponding to a plurality of memory sections of the memory. Each redundancy latch section 111 includes at least one normal redundancy latch unit 1111. At least a portion of the plurality of redundancy latch sections 111 is configured into at least one redundancy latch sharing group 112. Each redundancy latch sharing group 112 includes at least one shared redundancy latch unit 1121. Each redundancy latch sharing group 112 corresponds to at least two redundancy latch sections 111. The at least two redundancy latch sections 111 share at least one shared redundancy latch unit 1121. In this way, the shared redundancy latch units 1121 in the redundancy latch circuit 140 can be shared by at least two redundancy latch sections 111 and thus can be shared and utilized by at least two memory sections, such that the utilization rate of the redundancy resources may be improved, and the redundancy resources and the area of the circuit may be saved.

As shown in FIG. 7, FIG. 7 is a structural schematic view of a memory according to an embodiment of the present disclosure. The memory 1000 is a storage device based on semiconductor components. In the present embodiment, specifically, the memory 1000 is a dynamic random memory (DRAM), but the present disclosure is not limited to the DRAM. The memory 1000 may be the DRAM, a static random memory (SRAM), a pseudo-static random memory (PSRAM), or other memories that require redundancy repair. The memory 1000 may include, but is not limited to, the redundancy latch decoder circuit 100, a memory array 200, a sense amplification circuit 300, and an input and output circuit 400.

The memory array 200 includes k memory sections 210 arranged from up to down in the column direction. Specifically, the memory array 200 includes a memory section <0> to a memory section <k>. Each memory section corresponds to the row direction of the memory 1000. More specifically, each memory section 210 includes eight memory blocks 211 in the row direction. Specifically, each memory section 210 includes a memory block mat<0> to a memory block mat<7> in the row direction. When memory 1000 performs an operation of reading data, each memory block 211 outputs 8 bits of data, and each memory section 210 outputs 64 bits of data. The redundancy latch decoder circuit 100 may decode a column address and drives the corresponding column selection signal line YST or drives the redundancy column selection signal line RYST to access data in each memory block 211 in the memory section 210. The data in each memory block 211 may be amplified by the sense amplification circuit 300 and may be subsequently output via the input and output circuit 400.

Figure 8:
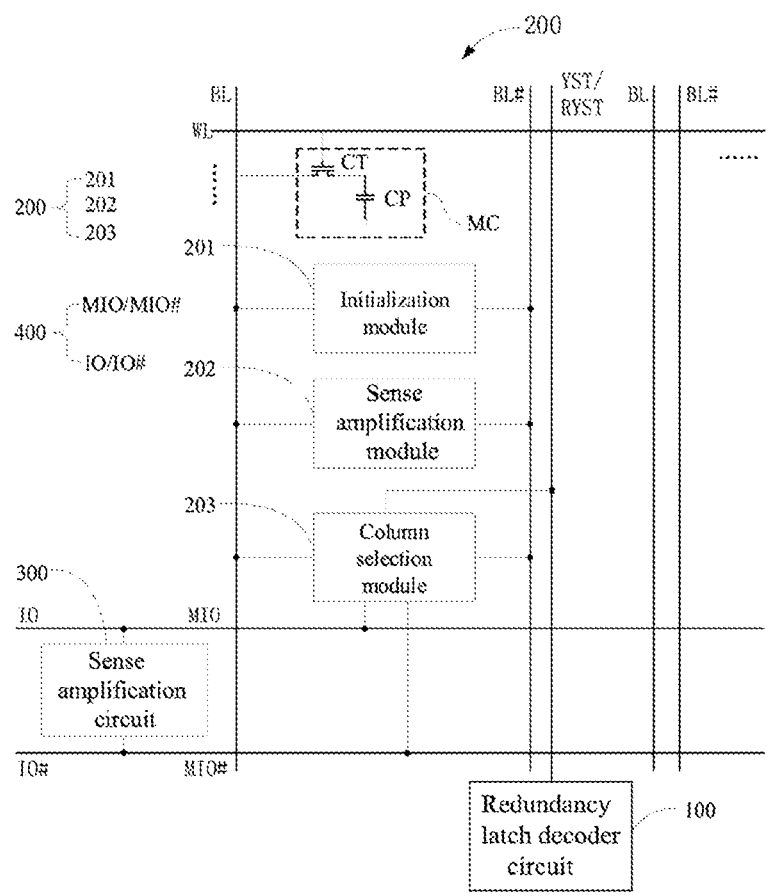
FIG. 8 is a structural schematic view of a memory array according to an embodiment of the present disclosure.

As shown in FIG. 8, FIG. 8 is a structural schematic view of a memory array according to an embodiment of the present disclosure. The memory array 200 includes a plurality of word lines WL, a plurality of complementary bit line pairs BL/BL#, and a plurality of memory cells MC.

Each memory cell MC is coupled to one word line WL and one complementary bit line pair BL/BL#. Each complementary bit line pair BL/BL# includes a target bit line BL and a complementary bit line BL#. The memory cell MC includes a memory capacitor CP and an access switch CT. The memory capacitor CP is coupled between the access switch CT and a common terminal. The access switch CT is coupled between the storage capacitor CP and the target bit line BL, and a control end of the access switch CT is coupled to the word line WL. The storage capacitor CP indicates a logic "1" and a logic "0" based on the number of charges stored in the storage capacitor CP, or in other words, based on a voltage difference between two terminals of the storage capacitor CP being high or low. The access switch CT being on or off determines that reading and rewriting information stored in the storage capacitor CP is allowed or prohibited. Specifically, the word line WL determines whether the access switch CT is on or off. The bit line BL is the only way that the outside may access the memory capacitor CP. When the access switch CT is on, the outside may perform reading or writing on the memory capacitor CP via the bit line BL.

The memory array 200 further includes a plurality of initialization modules 201, a plurality of sense amplification modules 202, and a plurality of column selection modules 203. Each initialization module 201 is coupled to a corresponding one complementary bit pair BL/BL# to charge the corresponding complementary bit pair BL/BL# to an initialization potential Vref during a pre-charging phase. Each sense amplification module 202 is coupled to one corresponding complementary bit pair BL/BL# to perform a signal amplification operation on the corresponding complementary bit pair BL/BL#. Each column selection module 203 is coupled to one complementary bit pair BL/BL# and is coupled to one column selection signal line YST/one redundancy column selection signal line RYST to enable the complementary bit pair BL/BL# to be selected with a complementary intermediate input/output line pairs MIO/MIO# while the redundancy latch decoder circuit 100 drives the column selection signal line YST/redundancy column selection signal line RYST.

The input-output circuit 400 includes a plurality of complementary intermediate input-output line pairs MIO/MIO# and a plurality of complementary input-output line pairs IO/IO#. The complementary intermediate input-output line pairs MIO/MIO# are coupled to the complementary bit line pairs BL/BL# via the column selection modules 203. Each complementary intermediate input-output line pair MIO/MIO# includes a target intermediate input-output line MIO and a complementary intermediate input-output line MIO#. The target intermediate input-output line MIO is coupled to the target bit line BL via the column selection module 203. The complementary intermediate input-output line MIO# is coupled to the complementary bit line BL# via the column selection module 203. To be noted that, in other embodiments, the input-output circuit 400 further includes a plurality of complementary local input-output line pairs LIO/LIO#(not shown), a plurality of complementary intermediate input-output line pairs MIO/MIO#, and a plurality of complementary input-output line pairs IO/IO#. The complementary local input-output line pair LIO/LIO# is coupled to the complementary bit line pair BL/BL# via the column selection module 203. The complementary local input-output line pair LIO/LIO# controls the coupling to the complementary intermediate input-output line pair MIO/MIO# via a switch circuit (not shown).

When the random memory 1000 performs a reading operation, the data in a to-be-accessed memory cell MC is firstly amplified by the sense amplification module 202. Subsequently, the amplified data is selected with, through the column selection module 203, a corresponding complementary bit line pair BL/BL# and a corresponding complementary intermediate input-output line pair MIO/MIO#. In the following, the data in this memory cell MC is further amplified by the sense amplification circuit 300 and is output to a corresponding complementary input-output line pair IO/IO#. The sense amplification circuit 300 includes a plurality of secondary sense amplification modules. Each secondary sense amplification module is configured to further amplify data on the complementary intermediate input-output line pair MIO/MIO# and to output the amplified data to the corresponding complementary input-output line pair IO/IO#.

In other embodiments, the input-output circuit 400 may further include a writing driving module, configured to write external data to the memory cell MC.

Further, each column selection module 203 is coupled to one complementary bit line pair BL/BL#. Each column selection module 203 is coupled to one column selection signal line YST/one redundancy column selection signal line RYST. In this way, when the redundancy latch decoder circuit 100 drives the column selection signal line YST/ redundancy column selection signal line RYST, the complementary bit pair BL/BL# is selected with the complementary intermediate input-output pair MIO/MIO#.

In the present embodiment, one column selection signal line YST/redundancy column selection signal line RYST in one memory block MAT is coupled to eight column selection modules 203.

In the present embodiment, when the memory cell MC corresponding to a certain column selection signal line YST is defective, resulting in the reading or writing being unable to be performed normally, the memory cell MC corresponding to the redundancy column selection signal line RYST may be used for replacement to improve the yield of the memory. The address of the abnormal column selection signal line (bad block address) may be latched in the redundancy latch circuit 140 in the redundancy latch decoder circuit 100. In addition to the aforementioned redundancy column selection signal line RYST, the column redundancy resource of the present disclosure may alternatively be implemented as a redundancy bit line RBL (not shown) or a redundancy input-output line RIO (not shown). The present disclosure is not limited to the above-listed column redundancy resources.

Figure 9:
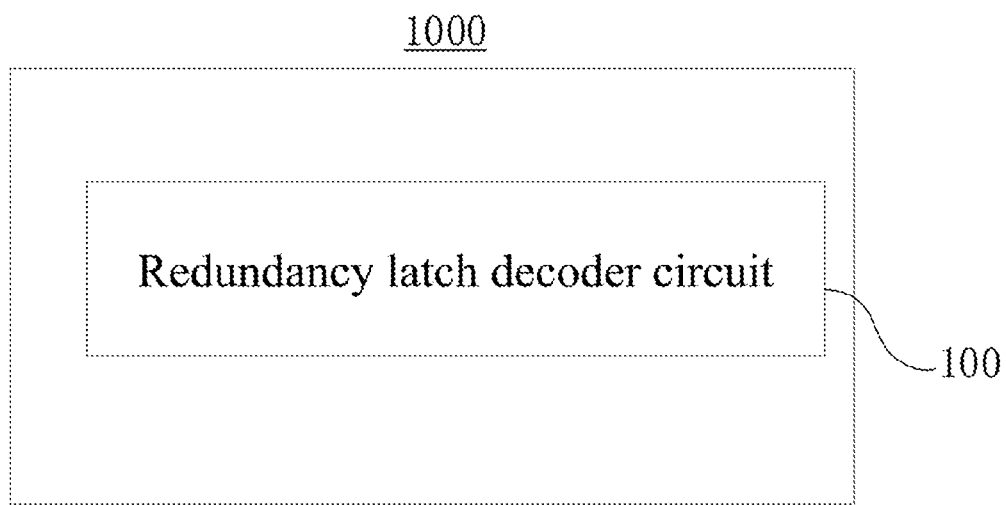
FIG. 9 is a structural schematic view of a memory according to another embodiment of the present disclosure.

As shown in FIG. 9, FIG. 9 is a structural schematic view of a memory according to another embodiment of the present disclosure. The random memory 1000 may be the random memory DRAM, the static random memory SRAM or the pseudo-static random memory (PSRAM). The random memory 1000 includes the redundancy latch decoder circuit 100.

The above description shows only an implementation of the present disclosure and is not intended to limit the scope of the present disclosure. Any equivalent structure or equivalent process transformation performed based on the specification and the accompanying drawings of the present disclosure, applied directly or indirectly in other related fields, shall be equally included in the scope of the present disclosure.

What is claimed is:

1. A redundancy latch decoder circuit, applied to a memory, the redundancy latch decoder circuit comprising:
a redundancy latch circuit, comprising a plurality of redundancy latch sections corresponding to a plurality of memory sections of the memory, wherein each of the plurality of redundancy latch sections comprises at least one normal redundancy latch unit, at least a portion of the plurality of redundancy latch sections is configured into at least one redundancy latch sharing group, each of the at least one redundancy latch sharing group comprises at least one shared redundancy latch unit, each of the at least one redundancy latch sharing group corresponds to at least two of the plurality of redundancy latch sections, and said at least two of the plurality of redundancy latch sections share said at least one shared redundancy latch unit; and a redundancy decoder circuit, coupled to the redundancy latch circuit to receive a redundancy address, wherein the redundancy decoder circuit is configured to enable, in response to an addressing address matching the redundancy address, a corresponding redundancy signal line to address a redundancy memory resource in the memory;

wherein each of the plurality of redundancy latch sections comprises n normal redundancy latch units; any one of the at least one redundancy latch sharing group comprises m shared redundancy latch units: the m shared redundancy latch units are arranged in one of the at least two redundancy latch sections; the rest of the at least two redundancy latch sections shares the m shared redundancy latch units; and for any one of the plurality of memory sections, each of the corresponding plurality of redundancy latch sections is configured to comprise (n+m) redundancy latch units.

2. The redundancy latch decoder circuit according to claim 1, wherein, said at least one shared redundancy latch unit is arranged in one of said at least two of the plurality of redundancy latch sections, the rest of said at least two of the plurality of redundancy latch sections corresponding to the redundancy latch sharing group share said at least one shared redundancy latch unit; or said at least one shared redundancy latch unit is dispersed in said at least two of the plurality of redundancy latch sections, said at least two of the plurality of redundancy latch sections corresponding to the redundancy latch sharing group share said at least one shared redundancy latch unit.

3. The redundancy latch decoder circuit according to claim 1, wherein, each of the at least one redundancy latch sharing group corresponds to two adjacent redundancy latch sections of the plurality of redundancy latch sections, each of the two adjacent redundancy latch sections comprises the n normal redundancy latch units, any one of the at least one redundancy latch sharing group comprises the m shared redundancy latch units, the m shared redundancy latch units are arranged in one of the two adjacent redundancy latch sections, the other one of the two adjacent redundancy latch sections shares the m shared redundancy latch units; for any one of the plurality of memory sections, each of the corresponding plurality of redundancy latch sections is configured to comprise (n+m) redundancy latch units; or each of the at least one redundancy latch sharing group corresponds to three adjacent redundancy latch sections of the plurality of redundancy latch sections, each of the three adjacent redundancy latch sections comprises the n normal redundancy latch units, any one of the at least one redundancy latch sharing group comprises the m shared redundancy latch units, the m shared redundancy latch units are arranged in one of the three adjacent redundancy latch sections, the rest of the three adjacent redundancy latch sections share the m shared redundancy latch units; for any one of the plurality of memory sections, each of the corresponding plurality of redundancy latch sections is configured to comprise (n+m) redundancy latch units.

4. The redundancy latch decoder circuit according to claim 1, wherein, the redundancy latch circuit comprises:

a redundancy latch array, comprising the plurality of redundancy latch sections, wherein the redundancy latch array is configured to receive a bad block address, memory section indication information, and a reset signal to latch the bad block address to a corresponding one of the plurality of redundancy latch sections in a bit-by-bit manner; and a selection circuit, coupled to the redundancy latch array to receive address bits output by the redundancy latch array, wherein the selection circuit is further configured to receive a first set of selection signals and a second set of selection signals; the selection circuit is configured to determine a current redundancy latch section corresponding to a current operation memory section based on the first set of selection signals and to determine a current redundancy latch sharing group corresponding to the current redundancy latch section based on the second set of selection signals to selectively output a first redundancy address and a second redundancy address; wherein the first redundancy address is formed by combining address bits latched by normal redundancy latch units in the current redundancy latch section, and the second redundancy address is formed by combining address bits latched by shared redundancy latch units corresponding to the current redundancy latch sharing group.

5. The redundancy latch decoder circuit according to claim 4, wherein, the first set of selection signals comprises a plurality of first selection signals, the plurality of first selection signals are configured to cooperate with each other to determine the current redundancy latch section from the plurality of redundancy latch sections; and the second set of selection signals comprises a plurality of second selection signals, the plurality of second selection signals are configured to cooperate with each other to determine, from the at least one redundancy latch sharing group, the current redundancy latch sharing group corresponding to the current redundancy latch section.

6. The redundancy latch decoder circuit according to claim 4, wherein, the redundancy decoder circuit is coupled to the selection circuit, wherein, while an addressing operation is being performed, the redundancy decoder circuit is configured to:

compare the addressing address to each one of the first redundancy address and the second redundancy address; and enable the corresponding redundancy signal line to address the redundancy memory resource in the memory in response to the addressing address being matched with either one of the first redundancy address and the second redundancy address.

7. The redundancy latch decoder circuit according to claim 6, wherein the redundancy decoder circuit comprises:

a first redundancy decoder unit, coupled to the selection circuit and configured to receive the addressing address, wherein, while the addressing operation is being performed, the first redundancy decoder unit is configured to: compare the addressing address to each one of the first redundancy address and the second redundancy address; and generate a corresponding redundancy enabling signal in response to the addressing address being matched with either one of the first redundancy address and the second redundancy address; and a second redundancy decoder unit, coupled to the first redundancy decoder unit and configured to receive the addressing address, wherein, while the addressing operation is being performed, the second redundancy decoder unit is configured to:

mask, in response to the first redundancy decoder unit generating the corresponding redundancy enabling signal, the addressing address and to enable the corresponding redundancy signal line based on the redundancy enabling signal to address the corresponding redundancy memory resource in the memory; and enable, in response to the first redundancy decoder unit not generating the corresponding redundancy enabling signal, a corresponding normal signal line based on the addressing address to normally address the corresponding normal memory resource in the memory.

8. The redundancy latch decoder circuit according to claim 7, wherein the redundancy latch circuit comprises a column redundancy latch circuit, the redundancy decoder circuit comprises a column redundancy decoder circuit, the redundancy signal line comprises a redundancy column selection signal line, the normal signal line comprises a normal column selection signal line, k memory sections of the plurality of memory sections of the memory are arranged in a column direction, each of the k memory sections corresponds to a row direction of the memory.

9. The redundancy latch decoder circuit according to claim 7, wherein the number of normal signal lines is x, and the number of the redundancy signal lines is y, wherein in response to one of y redundancy enabling signals being set, the second redundancy decoder unit is configured to enable one of the y redundancy signal lines correspondingly; and in response to none of the y redundancy enabling signals being set, the second redundancy decoder unit is configured to enable one of the x normal signal lines correspondingly based on the addressing address.

10. The redundancy latch decoder circuit according to claim 7, wherein, the first redundancy decoder unit comprises a plurality of logic gate circuits, each of the plurality of logic gate circuits is configured to receive the addressing address and one of the first redundancy address and the second redundancy address, to compare the addressing address to the received one of the first redundancy address and the second redundancy address, wherein the plurality of logic gate circuits comprise a logic exclusive or gate circuit.

11. A memory, comprising a redundancy latch decoder circuit, applied to a memory, wherein the redundancy latch decoder circuit comprises:

a redundancy latch circuit, comprising a plurality of redundancy latch sections corresponding to a plurality of memory sections of the memory, wherein each of the plurality of redundancy latch sections comprises at least one normal redundancy latch unit, at least a portion of the plurality of redundancy latch sections is configured into at least one redundancy latch sharing group, each of the at least one redundancy latch sharing group comprises at least one shared redundancy latch unit, each of the at least one redundancy latch sharing group corresponds to at least two of the plurality of redundancy latch sections, and said at least two of the plurality of redundancy latch sections share said at least one shared redundancy latch unit; and a redundancy decoder circuit, coupled to the redundancy latch circuit to receive a redundancy address, wherein the redundancy decoder circuit is configured to enable, in response to an addressing address matching the redundancy address, a corresponding redundancy signal line to address a redundancy memory resource in the memory;

wherein each of the plurality of redundancy latch sections comprises n normal redundancy latch units: any one of the at least one redundancy latch sharing group comprises m shared redundancy latch units; the m shared redundancy latch units are arranged in one of the at least two redundancy latch sections; the rest of the at least two redundancy latch sections shares the m shared redundancy latch units; and for any one of the plurality of memory sections, each of the corresponding plurality of redundancy latch sections is configured to comprise (n+m) redundancy latch units.

12. The memory according to claim 11, wherein, said at least one shared redundancy latch unit is arranged in one of said at least two of the plurality of redundancy latch sections, the rest of said at least two of the plurality of redundancy latch sections corresponding to the redundancy latch sharing group share said at least one shared redundancy latch unit; or said at least one shared redundancy latch unit is dispersed in said at least two of the plurality of redundancy latch sections, said at least two of the plurality of redundancy latch sections corresponding to the redundancy latch sharing group share said at least one shared redundancy latch unit.

13. The memory according to claim 11, wherein, each of the at least one redundancy latch sharing group corresponds to two adjacent redundancy latch sections of the plurality of redundancy latch sections, each of the two adjacent redundancy latch sections comprises the n normal redundancy latch units, any one of the at least one redundancy latch sharing group comprises the m shared redundancy latch units, the m shared redundancy latch units are arranged in one of the two adjacent redundancy latch sections, the other one of the two adjacent redundancy latch sections shares the m shared redundancy latch units; for any one of the plurality of memory sections, each of the corresponding plurality of redundancy latch sections is configured to comprise (n+m) redundancy latch units; or each of the at least one redundancy latch sharing group corresponds to three adjacent redundancy latch sections of the plurality of redundancy latch sections, each of the three adjacent redundancy latch sections comprises the n normal redundancy latch units, any one of the at least one redundancy latch sharing group comprises the m shared redundancy latch units, the m shared redundancy latch units are arranged in one of the three adjacent redundancy latch sections, the rest of the three adjacent redundancy latch sections share the m shared redundancy latch units; for any one of the plurality of memory sections, each of the corresponding plurality of redundancy latch sections is configured to comprise (n+m) redundancy latch units.

14. The memory according to claim 11, wherein the redundancy latch circuit comprises:
a redundancy latch array, comprising the plurality of redundancy latch sections, wherein the redundancy latch array is configured to receive a bad block address, memory section indication information, and a reset signal to latch the bad block address to a corresponding one of the plurality of redundancy latch sections in a bit-by-bit manner; and
a selection circuit, coupled to the redundancy latch array to receive address bits output by the redundancy latch array, wherein the selection circuit is further configured to receive a first set of selection signals and a second set of selection signals; the selection circuit is configured to determine a current redundancy latch section corresponding to a current operation memory section based on the first set of selection signals and to determine a current redundancy latch sharing group corresponding to the current redundancy latch section based on the second set of selection signals to selectively output a first redundancy address and a second redundancy address; wherein the first redundancy address is formed by combining address bits latched by normal redundancy latch units in the current redundancy latch section, and the second redundancy address is formed by combining address bits latched by shared redundancy latch units corresponding to the current redundancy latch sharing group.

15. The memory according to claim 14, wherein,
the first set of selection signals comprises a plurality of first selection signals, the plurality of first selection signals are configured to cooperate with each other to determine the current redundancy latch section from the plurality of redundancy latch sections; and
the second set of selection signals comprises a plurality of second selection signals, the plurality of second selection signals are configured to cooperate with each other to determine, from the at least one redundancy latch sharing group, the current redundancy latch sharing group corresponding to the current redundancy latch section.

16. The memory according to claim 14, wherein, the redundancy decoder circuit is coupled to the selection circuit, wherein, while an addressing operation is being performed, the redundancy decoder circuit is configured to:
compare the addressing address to each one of the first redundancy address and the second redundancy address; and
enable the corresponding redundancy signal line to address the redundancy memory resource in the memory in response to the addressing address being matched with either one of the first redundancy address and the second redundancy address.

17. The memory according to claim 16, wherein the redundancy decoder circuit comprises:
a first redundancy decoder unit, coupled to the selection circuit and configured to receive the addressing address, wherein, while the addressing operation is being performed, the first redundancy decoder unit is configured to: compare the addressing address to each one of the first redundancy address and the second redundancy address; and generate a corresponding redundancy enabling signal in response to the addressing address being matched with either one of the first redundancy address and the second redundancy address; and
a second redundancy decoder unit, coupled to the first redundancy decoder unit and configured to receive the addressing address, wherein, while the addressing operation is being performed, the second redundancy decoder unit is configured to:
mask, in response to the first redundancy decoder unit generating the corresponding redundancy enabling signal, the addressing address and to enable the corresponding redundancy signal line based on the redundancy enabling signal to address the corresponding redundancy memory resource in the memory; and
enable, in response to the first redundancy decoder unit not generating the corresponding redundancy enabling signal, a corresponding normal signal line based on the addressing address to normally address the corresponding normal memory resource in the memory.

18. The memory according to claim 17, wherein the redundancy latch circuit comprises a column redundancy latch circuit, the redundancy decoder circuit comprises a column redundancy decoder circuit, the redundancy signal line comprises a redundancy column selection signal line, the normal signal line comprises a normal column selection signal line, k memory sections of the plurality of memory sections of the memory are arranged in a column direction, each of the k memory sections corresponds to a row direction of the memory.

19. The memory according to claim 17, wherein the number of normal signal lines is x, and the number of the redundancy signal lines is y,
wherein in response to one of y redundancy enabling signals being set, the second redundancy decoder unit is configured to enable one of the y redundancy signal lines correspondingly; and
in response to none of the y redundancy enabling signals being set, the second redundancy decoder unit is configured to enable one of the x normal signal lines correspondingly based on the addressing address.

20. The memory according to claim 17, wherein,
the first redundancy decoder unit comprises a plurality of logic gate circuits, each of the plurality of logic gate circuits is configured to receive the addressing address and one of the first redundancy address and the second redundancy address, to compare the addressing address to the received one of the first redundancy address and the second redundancy address, wherein the plurality of logic gate circuits comprise a logic exclusive or gate circuit.

* * * * *